United States Patent
Funk et al.

(10) Patent No.: US 7,875,798 B2
(45) Date of Patent: *Jan. 25, 2011

(54) RAIN SHIELDED BOX FOR EXITING THROUGH SIDING

(76) Inventors: Anthony Isaac Funk, 5863-188A Street, Surrey, BC (CA) V3S 7T3; Robert Anthony Funk, 5863-188A Street, Surrey, BC (CA) V3S 7T3

(*) Notice: Subject to any disclaimer, the term of this patent is extended or adjusted under 35 U.S.C. 154(b) by 346 days.

This patent is subject to a terminal disclaimer.

(21) Appl. No.: 12/042,208

(22) Filed: Mar. 4, 2008

(65) Prior Publication Data

US 2008/0196938 A1 Aug. 21, 2008

Related U.S. Application Data

(63) Continuation-in-part of application No. 11/676,144, filed on Feb. 16, 2007, now Pat. No. 7,358,440.

(51) Int. Cl.
*H01H 9/02* (2006.01)

(52) U.S. Cl. .............. 174/58; 174/50; 174/60; 174/64; 248/906; 439/535

(58) Field of Classification Search ............ 174/17 VA, 174/50, 135, 17 CT, 60, 63, 64, 480, 481, 174/58; 220/3.8, 4.02, 3.2; 248/906; 439/535; 285/149.1; 361/826
See application file for complete search history.

(56) References Cited

U.S. PATENT DOCUMENTS

| 5,664,375 | A | 9/1997 | Ward |
| 6,310,287 | B1 | 10/2001 | Schiedegger |
| 6,359,220 | B2 | 3/2002 | Schiedegger |
| 6,723,921 | B2 | 4/2004 | Vagedes |
| 7,579,547 | B2 * | 8/2009 | Opaluch .................. 174/50 |
| 7,608,780 | B2 * | 10/2009 | McCarthy .................. 174/50 |
| 7,642,454 | B2 * | 1/2010 | Waites .................. 174/50 |
| 7,642,471 | B2 * | 1/2010 | Whitaker .................. 174/481 |
| 7,667,136 | B2 * | 2/2010 | Dinh et al. .................. 174/58 |
| 7,683,256 | B1 * | 3/2010 | Chumacero .................. 174/58 |

* cited by examiner

*Primary Examiner*—Dhiru R Patel
(74) *Attorney, Agent, or Firm*—Vermette & Co.; Clifford W. Vermette; Denis R. O'Brien

(57) ABSTRACT

A mounting box for installation on an exterior wall of a building. The mounting box has a box-shaped structure having a substantially horizontally disposed top surface when in situ, a nailing flange around a perimeter of the box-shaped structure, a downwardly and outwardly inclined shoulder on each side of the top surface, the shoulders each having a shoulder surface and a plurality of notches along an outer edge of the shoulder surface which attract and constrain the flow of water along the shoulders.

17 Claims, 10 Drawing Sheets

RAIN SHIELDED BOX FOR EXITING THROUGH SIDING

This Application is a CIP of U.S. application Ser. No. 11/676,144 filed Feb. 16, 2007 now U.S. Pat. No. 7,358,440.

FIELD

The present invention relates to rain shielded mounting boxes used to pass through siding clad building walls and provide access from the outside to such things as dryer outlets, electrical receptacles, light fixtures, gable vents, wall vents, water taps, soffit vents, etc. The present invention further relates to a combination mounting box and universal electrical base that is suitable for use as an electrical plug or switch or which can be used for an electrical appliance such as an outdoor light.

BACKGROUND

In installing electrical fixtures, receptacles, lights and the like on the exterior of a building wall, it is necessary to provide a means of preventing rain from entering into the wall past the siding. Typically, various central boxes are used which are designed to shield against the entry of rain. A typical mounting box has a perimeter nailing strip with nail holes to allow nailing of the mounting box to the surface of the sheathing covering the outside of the wall. The mounting box extends outwardly from the nailing strip. Exterior cladding or siding is placed over the nailing strip abutting the mounting box and a cover plate snaps over the mounting box abutting the siding. The mounting box deflects water to the sides but prior devices had no reliable way of further diverting the water flowing to the sides down the vertical sides of the mounting box and onto the siding below. Without such a feature water enters between the cladding and the sheathing where it can cause damage to the structural framework of the building. Even in systems such as that described in U.S. Pat. No. 6,951,081 issued to Bonshor which provides vertical channels formed between spaced apart flanges located on either side of the mounting box for the water to run down, water will still flow around the flange and into the region between the sheathing and the cladding.

U.S. Pat. No. 5,303,522 issued to Vagedes discloses a tab extending from partway down the nailing strip at an inclined angle towards an outside flange. Any water getting into the channel is supposed to run along the tab and away from the building wall to an exterior surface of the siding. The problem with Vagedes is that there is nothing to divert the water flowing to the sides along the top of the mounting box down to the tab. As a result water flowing to the sides enters the region between the sheathing and the cladding almost unimpeded.

Accordingly, it is an object of the invention to provide a water deflection system for a mounting box that constrains all of the water flowing onto a mounting box so that it flows down each side channel adjacent to the mounting box without penetrating the region between the sheathing and the cladding.

SUMMARY OF THE INVENTION

According to the invention there is provided a mounting box for installation on an exterior wall of a building. The mounting box has a box-shaped structure having a substantially horizontally disposed top surface when in situ, a nailing flange around a perimeter of the box-shaped structure, a downwardly and outwardly inclined shoulder on each side of the top surface, the shoulders each having a shoulder surface and a plurality of notches along an outer edge of the shoulder surface.

Preferably, a water diverting flange extends from side to side across the top surface spaced away from the nailing flange.

Advantageously, a rain drip flange extends across a bottom surface of the box-shaped structure having an outer surface continuous with the shoulder surfaces.

A cover plate has an opening to enable engagement of the box structure and a lock to constrain the cover from separation from the box structure.

Protuberances may be located on the inside of the opening of the cover and corresponding indents in top and bottom surfaces of the box structure engageable with the protuberances.

The cover plate may have a flange around its periphery and the separation of the cover plate flange and the nailing flange can be changed by reversing the side of the cover plate flange that faces the nailing. In a another aspect of the invention there is provided a combination mounting box and universal electrical base for installation on an exterior wall of a building. The combination includes a box-shaped structure having a substantially horizontally disposed top surface when in situ, a nailing flange extending around a perimeter of the box-shaped structure; and a shoulder downwardly and outwardly inclined relative to the nailing flange, starting on each side of the top surface the shoulders each having a shoulder surface and a plurality of notches along an outer edge of the shoulder surface, a universal electrical base having a plurality of posts with threaded holes therein, and grounding bars coupled to these posts and to the threaded screw holes therein.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 2:
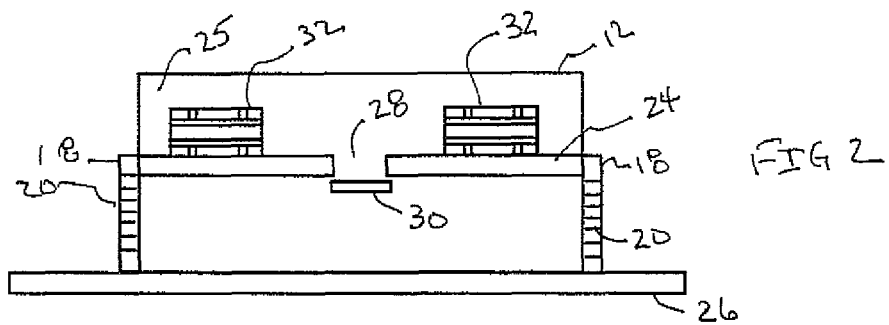
FIG. 2 is a top view of the mounting box.
Figure 1:
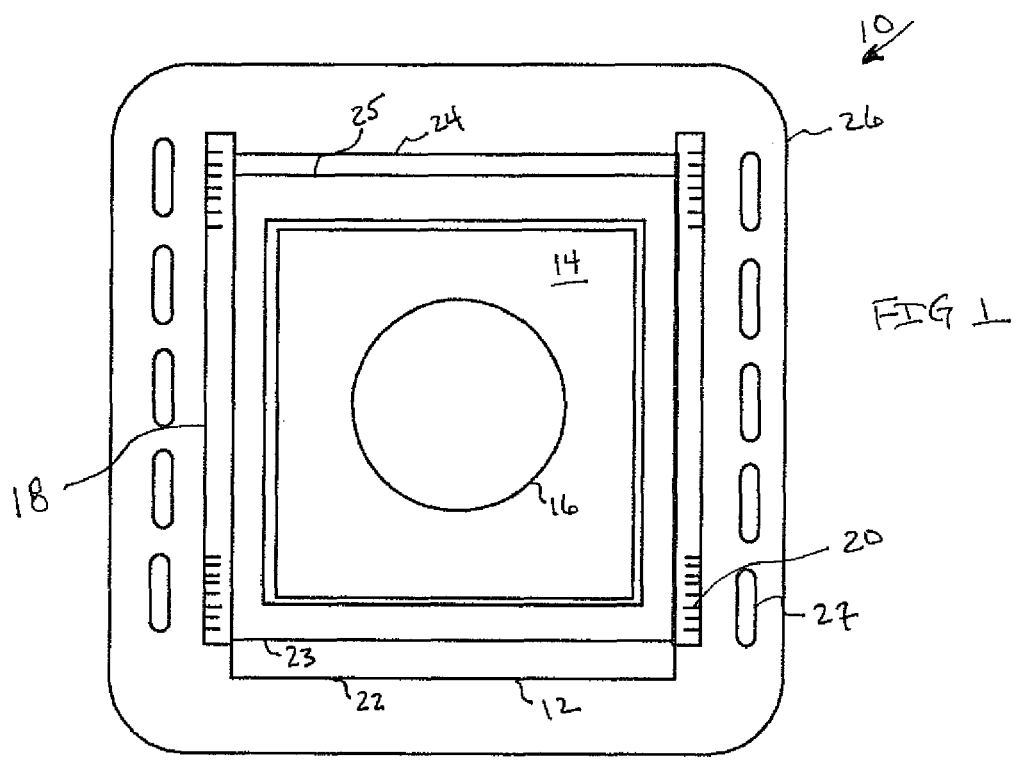
FIG. 1 is a front elevation view of the mounting box.
Figure 3:
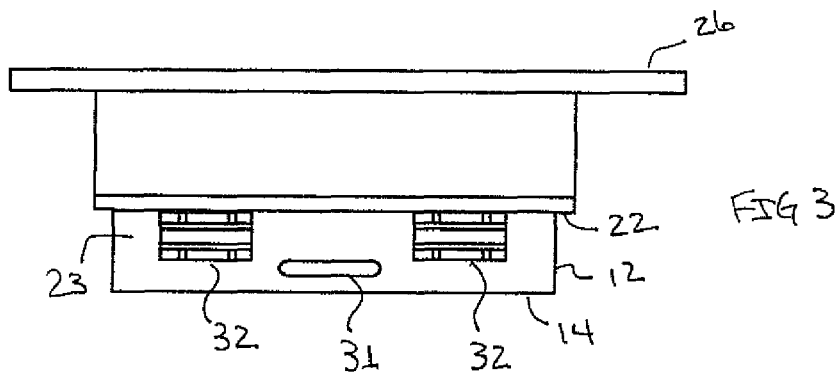
FIG. 3 is a bottom view of the mounting box
Figure 4:
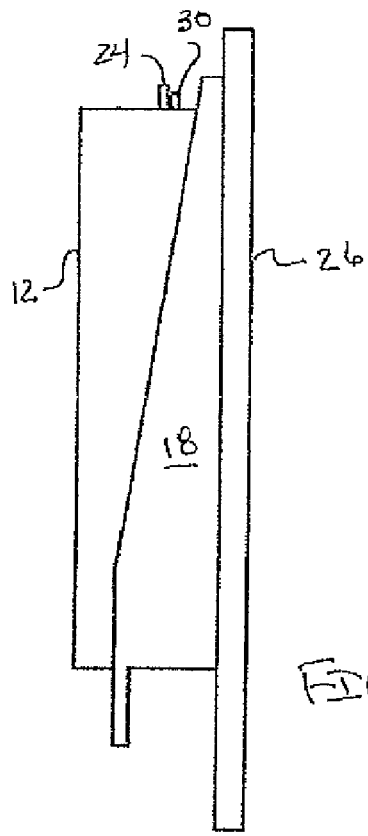
FIG. 4 is a side view of the mounting box.

FIGS. 1-4 show a mounting box 10 for a dryer vent having a central round opening within the front face of a protruding rectangular box-shaped structure 12. While a dryer vent box has been shown, the mounting box could be any one of a number of mounting boxes such as an electrical plug receptacle, a light fixture, a water tap receptacle, etc. A large rectangular nailing flange 26 is attached to a wall contacting end of said box-shaped structure 12. The nailing flange 26 runs around the perimeter of said box-shaped structure 12 and has recessed areas of reduced thickness for nails 27 along two opposed sides which are mounted vertically against an outside wall sheathing (not shown). A flange 24 runs along the top surface 25 of the box-shaped structure 12 down the center thereof as shown more clearly in FIG. 2. Flange 24 has a gap 28 in the center. Spaced away from the gap 28 a short distance is a slightly arcuate barrier 30 which serves to deflect water that hits the nailing flange 26 along the top and splashes back towards the flange 24. A flange 24 runs along the bottom surface 23 along the center thereof as seen in FIG. 3. In the top and bottom walls of the box-shaped structure 12 there are recesses 32 (see FIG. 2) which serve to engage protuberances 40 and 42 (see FIG. 5). Each recess 32 has three longitudinally extending slots with the outer slots having two ridges slightly recessed below the surface of the box. A rain drip flange 22 extends across the bottom surface of the box-shaped structure 12.

A moisture drain 31 is formed in the bottom surface 23 and serves to allow moisture that has penetrated into the interior of the box-shaped structure 12, for example, via an accessory such as a light bulb, to escape to the exterior of the box-shaped structure 12.

Figure 5:
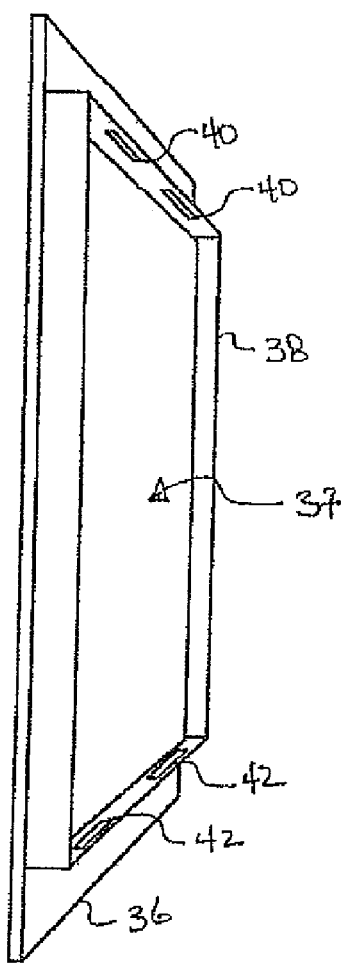
FIG. 5 is a perspective view of the cover.
Figure 6:
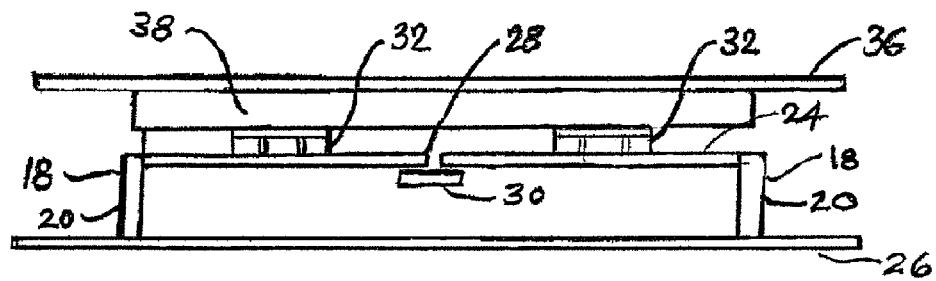
FIG. 6 is an end view of the box-shaped structure and cover plate engaged with a rectangular flange on the cover plate facing the box-shaped structure.
Figure 7:
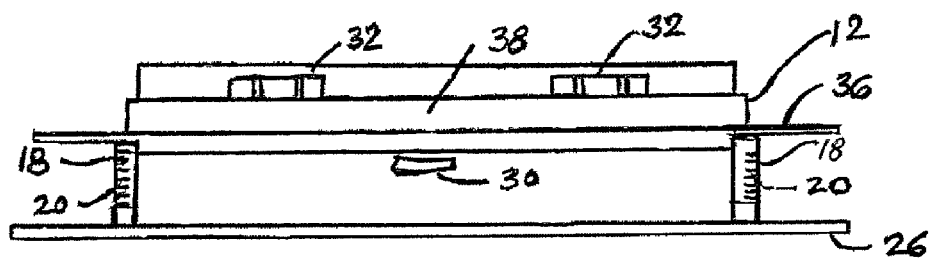
FIG. 7 is an end view of the box-shaped structure and cover plate engaged with the rectangular flange on the cover plate facing outwardly of the box-shaped structure.

Referring to FIGS. 5, 6, and 7, there is shown a cover plate 36 that fits over and locks to box-shaped structure 12. Cover plate 36 has a rectangular opening 37 which is bounded by a rectangular flange 38. On the interior of the rectangular flange 38 there are four protuberances 40 and 42; two on the top of flange 38 and two on the bottom with one at either end of the top and bottom flange walls (see FIG. 5). The locking process involves protuberances 40 and 42 being forced over the edge of the recesses 32 and entering a central slot of each recess 32 to lock the cover plate 36 to the box-shaped structure 12. With flange 38 facing the box-shaped structure 12, the protuberances 40 and 42 engage the central slot providing a first position for the cover in which the nailing flange and the cover plate 36 have the narrowest separation. Reversing the cover plate 36 and pushing together the cover plate 36 and the box-shaped structure 12 causes the protuberances 40 and 42 to enter the central slot giving the widest separation between the nailing flange 26 and the cover plate 36. Typically, the smallest separation between the nailing flange 26 and the cover plate 36 is ⅝ inches. By reversing the cover plate 36 the separation increases, typically, to 1¼ inches. In this way the separation of the nailing flange 26 and the cover plate 36 can be varied to accommodate siding of different thicknesses.

Once the mounting box 10 is installed, water running down the siding falls onto a top surface of the box-shaped structure 12. The water then splashes onto flanges 24 and 26 and moves generally towards the two sides. Shoulders 18 have a plurality of spaced apart notches or grooves 20 spaced along a length thereof near an outer edge of each surface of shoulder 18. Water so constrained to move towards the two sides, contacts notches 20 of shoulders 18. Upon contacting the notches 20, the water is immediately bound to the surfaces of the shoulder 18 by surface tension and flows down those surfaces to a rain drip flange 22. From the rain drip flange 22 water drips harmlessly onto an exterior of the siding. Notches 20 are only about 1/16 to 1/32 inches in length and are spaced only about 1/32 inch apart. It has been found that the notched surfaces intercept almost 100% of the rain that reaches the notched surfaces, providing complete rain shielding protection.

Figure 8:
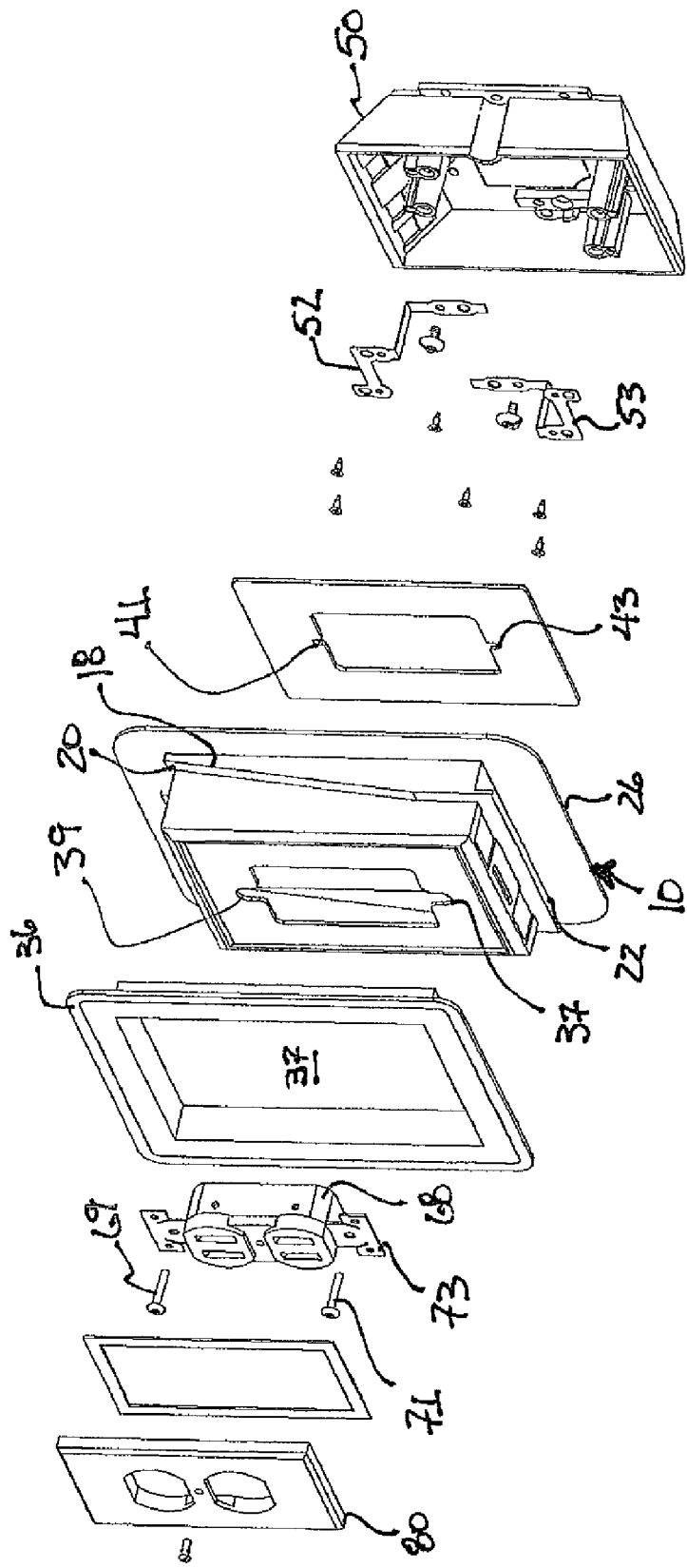
FIG. 8 is an exploded view of an electrical plug mounting box and a universal electrical base.
Figure 9:
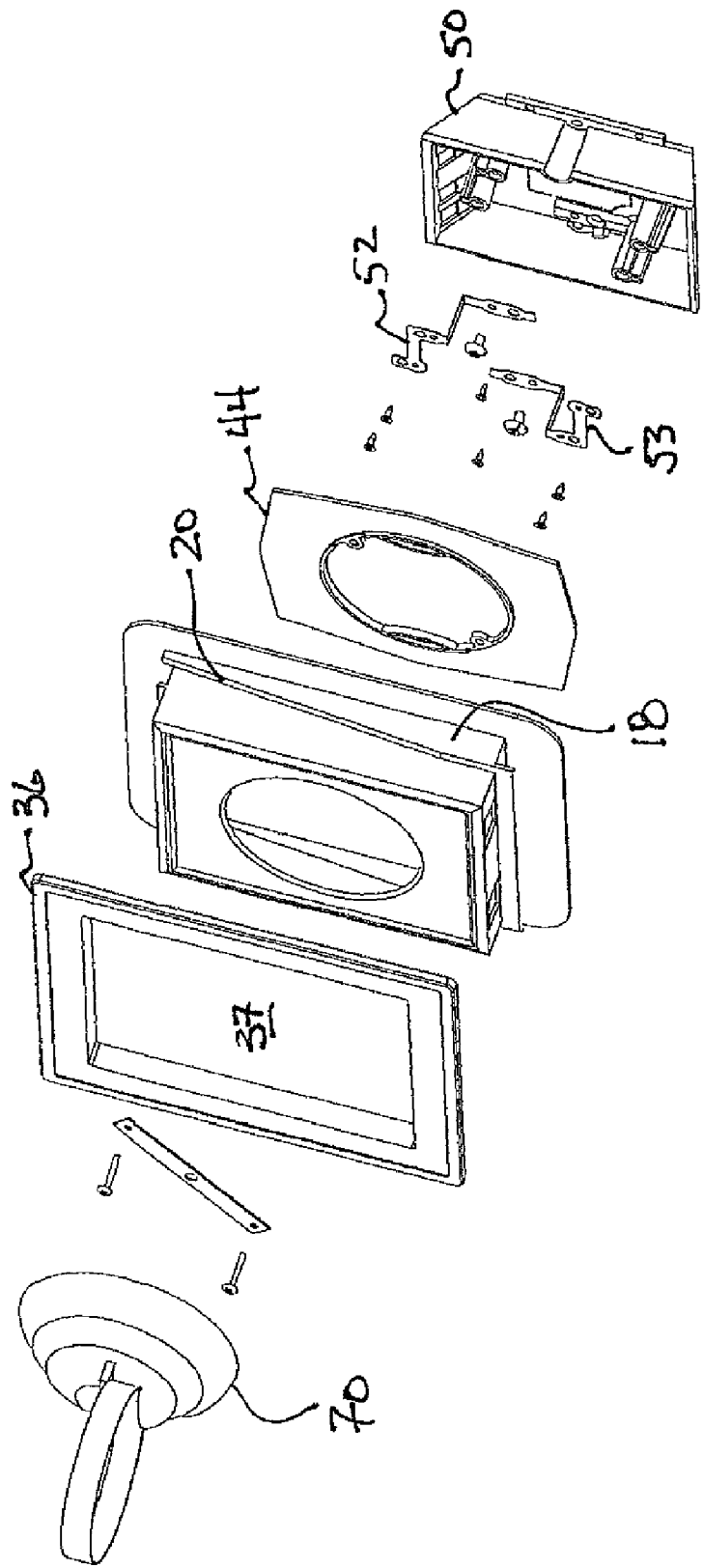
FIG. 9 is an exploded view of an electrical light mounting box and a universal electrical base.

A universal electrical base 50 that works in conjunction with the mounting box is seen in the exploded views of FIGS. 8 and 9. In FIG. 8 the universal electrical base 50 fits into the recess in the mounting box 10. Screw 69 for a conventional electrical plug 68 passes through plate 73, through screw openings 39 and 41 and engages a screw hole in a post of base 50. Similarly, screw 71 passes through the plug plate 73 through screw openings 37 and 43 and into a screw hole in a post of base 50.

Referring to FIG. 9 there is shown an alternative mounting box for lights 70 in which like numbers refer to like parts. Here plate 44 has a round opening to accommodate a round light base (not shown). Posts 57, 58, 56 and 60 receive screws to accommodate plugs or light fixtures.

Figure 10:
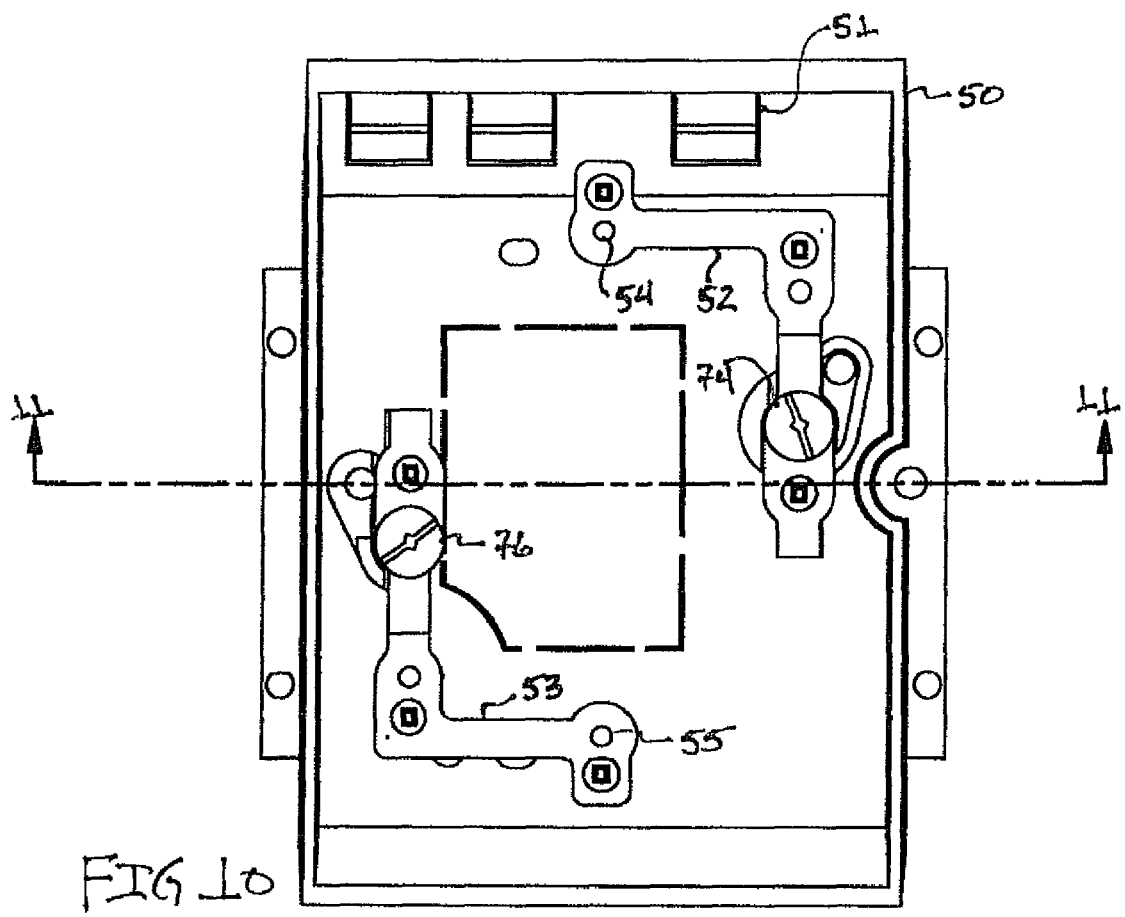
FIG. 10 is a top view of the universal electrical base.
Figure 11:
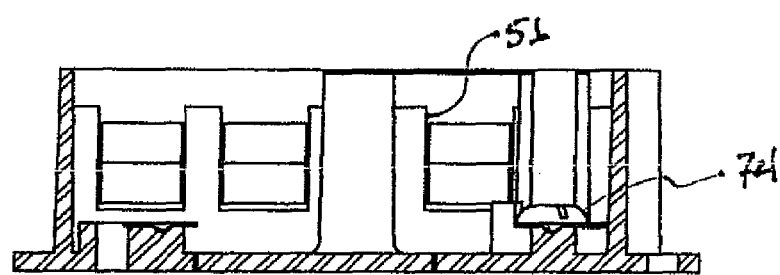
FIG. 11 is a sectional view of the universal electrical base taken along the line DD.

Referring to FIGS. 10 and 11 there is shown the interior of the universal electrical base 50. A grounding bar 53 interconnects post 55 with ground screw 76 and another grounding base 52 connects post 54 to ground screw 74. Insulated line wire (not shown) enters the interior of base 50 through tabbed openings 51.

Figure 12:
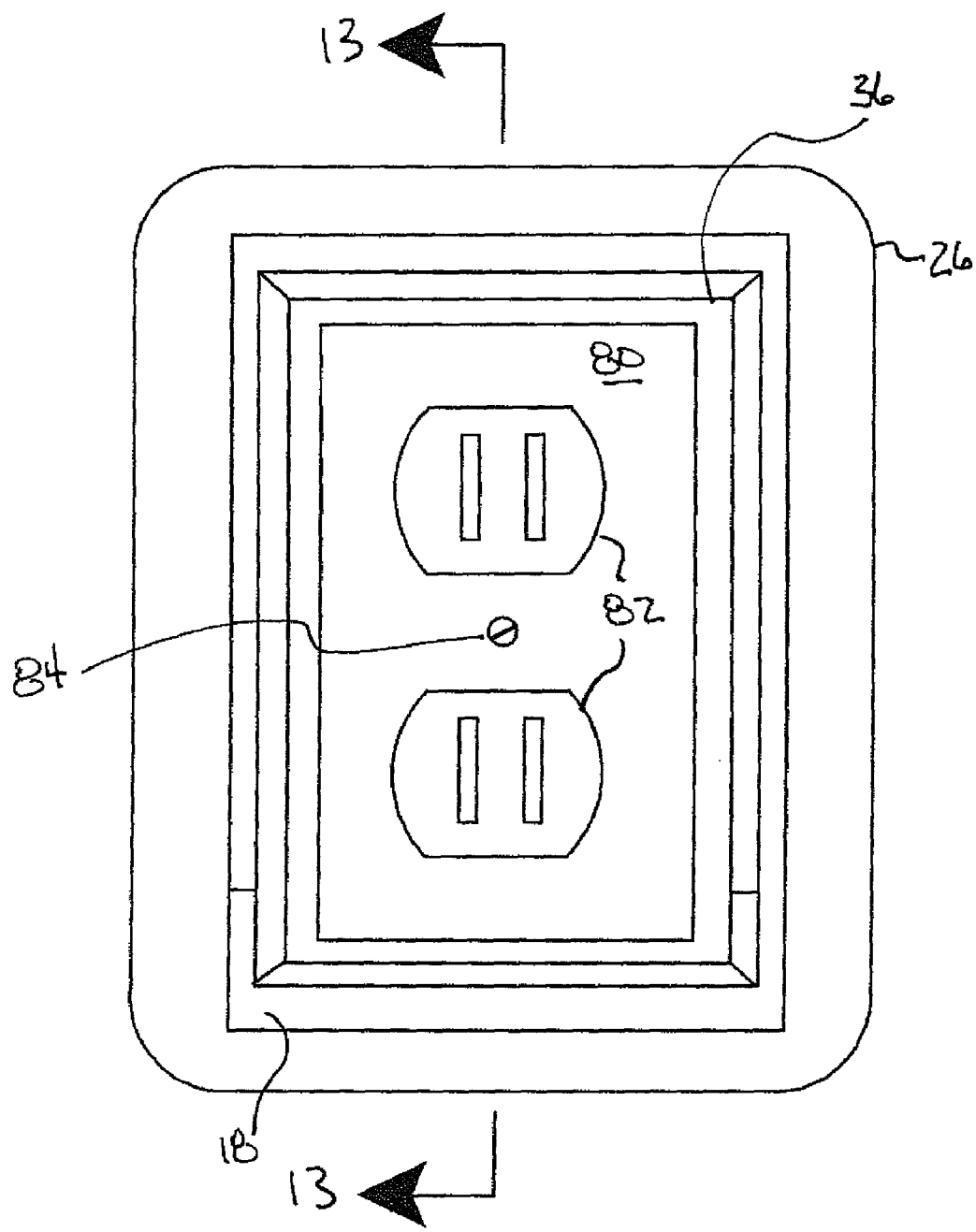
FIG. 12 is a front view of the plug mounting box and universal electrical base in assembled form.
Figure 13:
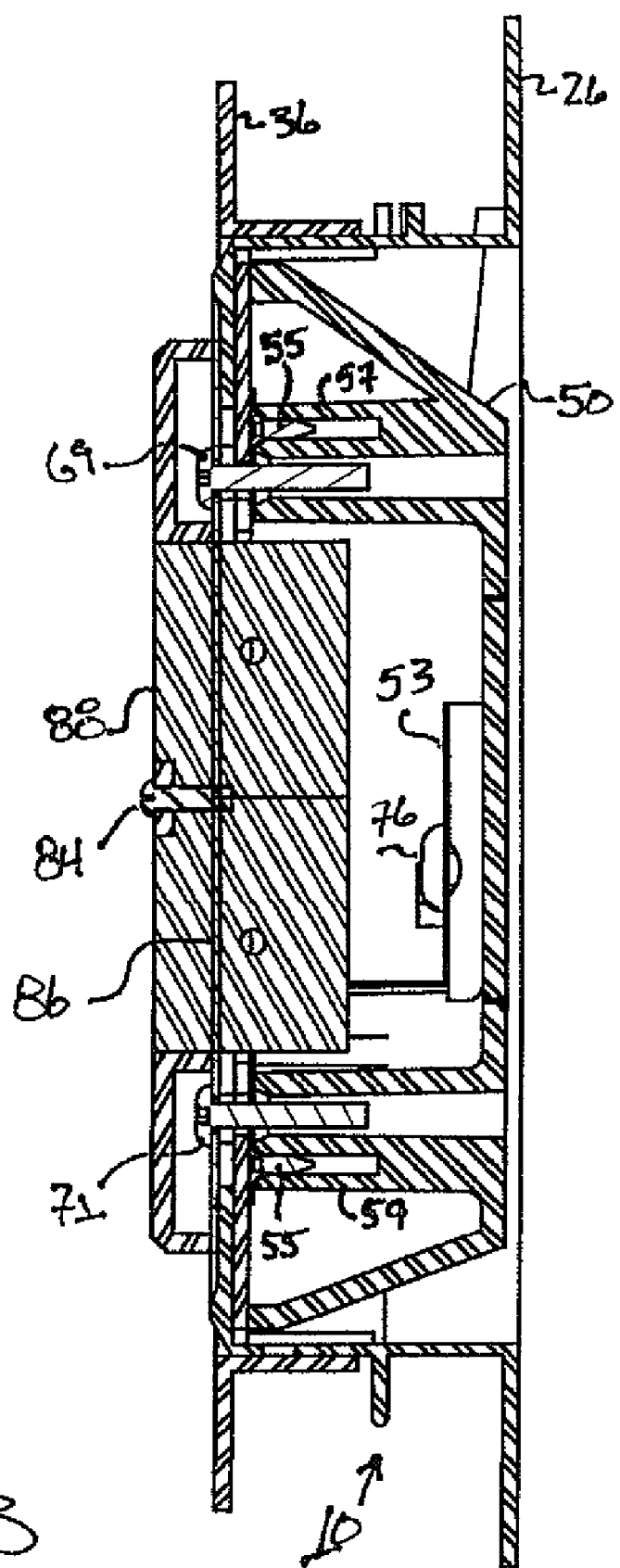
FIG. 13 is a sectional view of the plug mounting box and universal electrical base taken along the line AA of FIG. 12.

FIG. 12 shows an assembled form of FIG. 8. FIG. 13 is a sectional view of FIG. 12. Universal electrical base 50 is in place in the recess of mounting box 10. A plug body 88 is affixed to base 50 by means of screws 55 which engage the posts 57 and 59 on base 50. A cover plate 80 is attached to plate 86 by means of a screw 84. Two plug receptacles 82 are surrounded by cover plate 80.

Figure 14:
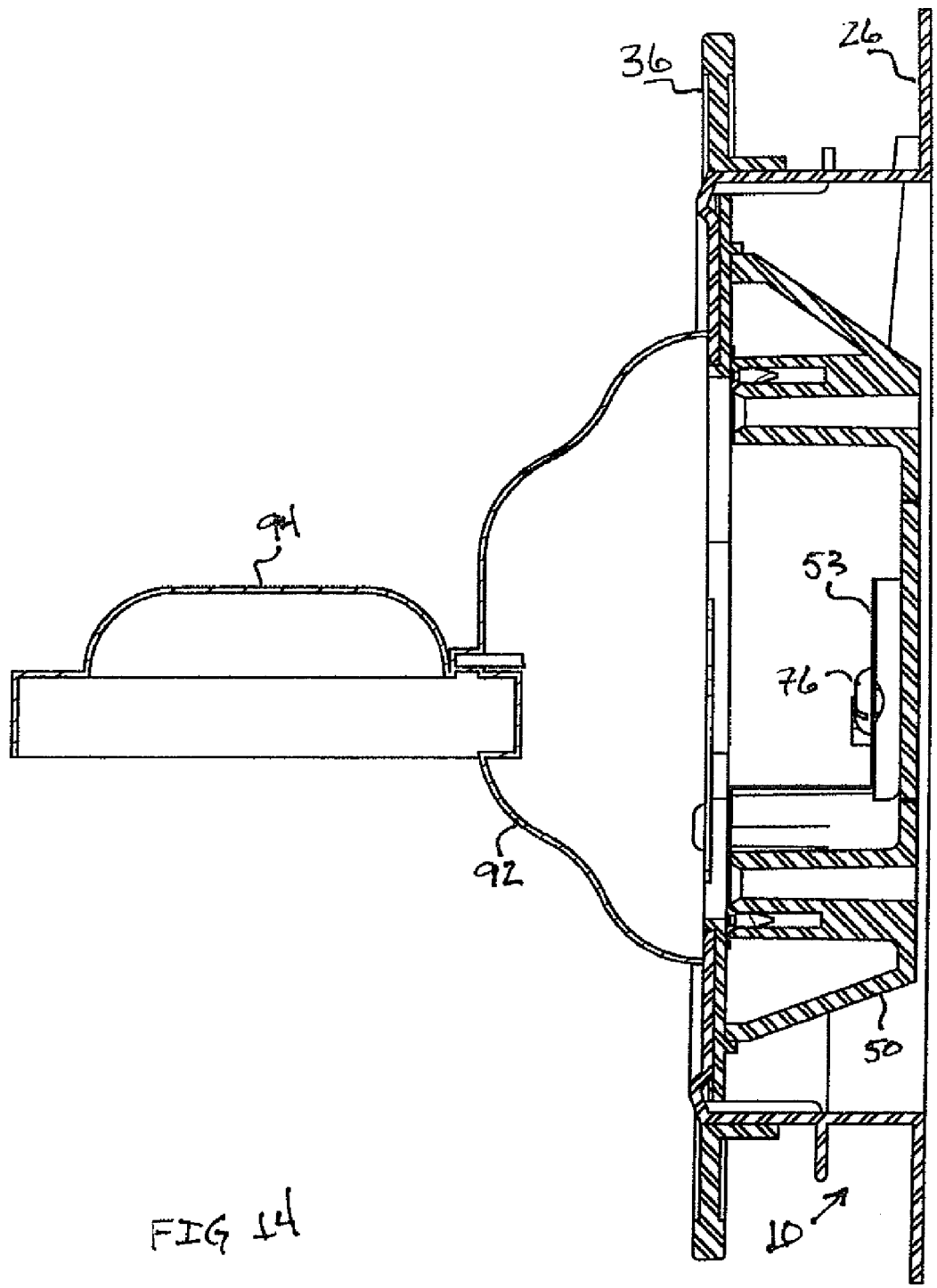
FIG. 14 is a sectional view of the light mounting box and universal electrical base.

Referring to FIG. 14 there is shown a cross-sectional view of the base 50 and box 10 as in FIG. 13 except that in place of the plug 68 there is a light fixture 94 which is held to the box exterior by a housing 92. The mounting box 10 and base 50 constitute a stand-alone system since no other electrical box is needed for the installation of an electrical appliance such as a light or plug. A wire is run through the wall on the high side of the mounting box and inserted into the mounting box for electrical connections. The mounting box is then attached to the wall at the appropriate depth to accommodate the cladding. The mounting box can also be attached to existing light and plug boxes as shown in FIGS. 15 and 16.

Figure 16:
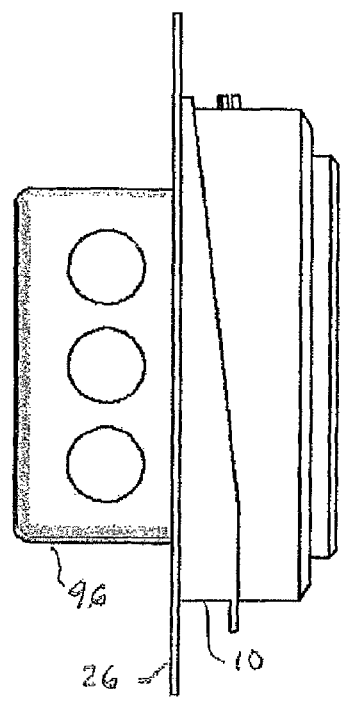
FIG. 16 is a side elevation view of FIG. 15.
Figure 15:
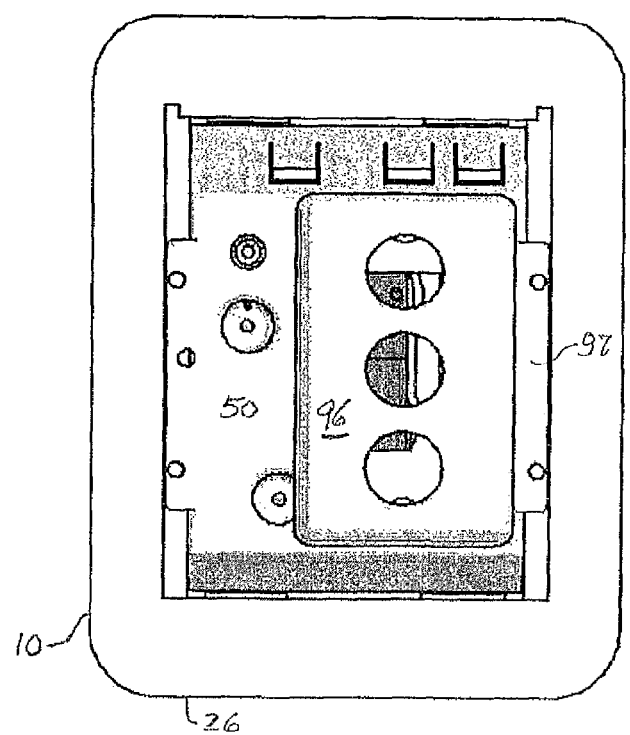
FIG. 15 is attachment of the base to a conventional plug box.

Referring to FIGS. 15 and 16 a standard electrical box 96 is affixed to mounting box 10 by means of a bracket 97 and screws (not shown) passing through the bracket 97.

Accordingly while this invention has been described with reference to illustrative embodiments, this description is not intended to be construed in a limiting sense. Various modifications of the illustrative embodiment will be apparent to those skilled in the art upon reference to this description. It is therefore contemplated that appended claims will cover any such modifications or embodiments as fall within the scope of the invention.

We claim:

1. An exterior wall mounting box, comprising:
    (a) a box-shaped structure, wherein said box-shaped structure comprises
        i) a substantially horizontal top surface;
        ii) a substantially horizontal bottom surface; and,
        iii) two opposing shoulders, wherein one of said shoulders is positioned on each side of said box-shaped structure, and wherein each of said shoulders has a plurality of notches or grooves along an outer edge of said shoulder; and, (b) a nailing flange extending around a perimeter of said box-shaped structure, wherein each of said shoulders is inclined downwardly and outwardly relative to said nailing flange when said mounting box is mounted in situ.

2. The mounting box of claim 1, further comprising a water diverting flange extending from side to side across said top surface, wherein said water diverting flanged is spaced apart from said nailing flange.

3. The mounting box of claim 1, further comprising a rain drip flange extending from side to side across said bottom surface of said box-shaped structure, wherein said rain drip flange is continuous with said shoulders.

4. The mounting box of claim 1, further comprising:
    (a) a cover plate, wherein said cover plate comprises an opening to enable engagement of said box-shaped structure; and,
    (b) a lock to reversibly secure said cover plate to said box-shaped structure.

5. The mounting box of claim 4, further comprising:
    (a) a protuberance on an inside portion of said cover plate; and,
    (b) an indent in said box-shaped structure,
    wherein said indent is engageable with said protuberance for connecting said cover plate to said box-shaped structure.

6. The mounting box of claim 4, wherein said cover plate comprises a cover plate flange around its periphery wherein said cover plate flange and said nailing flange are separated by a distance when said cover plate is attached to said box-shaped structure, and wherein said distance is determined by which surface of said cover plate flange faces said nailing flange.

7. The mounting box of claim 1, wherein said bottom surface of said box-shaped structure comprises an opening, wherein said opening allows moisture to escape from box-shaped structure.

8. A mounting box for providing a rain shielded mounting to an exterior wall of a building, wherein said mounting box comprises:
    (a) a box-shaped structure comprising: i) a top surface; ii) a bottom surface; and, iii) two opposing side surfaces;
    (b) a nailing flange extending around and affixed to a perimeter of said box-shaped structure, wherein said mounting box is attachable to the exterior wall by means of said nailing flange;
    (c) a water diverting flange extending from side to side across said top surface, wherein said water diverting flange is spaced away from said nailing flange;
    (d) two opposing shoulders, wherein one of said shoulders is on each side of said box-shaped structure, wherein each of said shoulders has a plurality of notches or grooves along an outer edge of said shoulder, and wherein each of said shoulders inclines downwardly and outwardly from said nailing flange;
    (e) a rain drip flange extending across said bottom surface of said box-shaped structure, wherein said rain drip flange is continuous with said shoulders;
    (f) a cover plate, wherein said cover plate comprises: i) an opening dimensioned to receive said box-shaped structure; and, ii) a cover plate flange extending around said opening; and,
    (g) a lock mechanism, wherein said cover plate is reversibly secured to said box-shaped structure by said lock mechanism.

9. The mounting box of claim 8, wherein said cover plate is reversibly engageable with said box-shaped structure so as to change a distance of separation between said cover plate flange and the nailing flange.

10. A combination mounting box and electrical base, wherein said mounting box comprises:
    (a) a box-shaped structure, wherein said box-shaped structure comprises: i) a substantially horizontal top surface; ii) a substantially horizontal bottom surface; and, iii) opposing shoulders, wherein each of said shoulders is located on a side of said box-shaped structure; and,
    (b) a nailing flange extending around a perimeter of said box-shaped structure;
    wherein each of said shoulders is inclined downwardly and outwardly relative to said nailing flange when said mounting box is mounted in situ; and wherein said electrical base comprises:
    (c) a plurality of posts with threaded screw holes therein; and,
    (d) grounding bars, wherein said grounding bars are coupled to said posts and to said threaded screw holes.

11. The combination of claim 10 wherein said mounting box further comprises a plurality of notches or grooves along outer edges of said shoulders.

12. The combination of claim 10, wherein said mounting box further comprises a water diverting flange spaced apart from said nailing flange and wherein said water diverting flange extends from side to side across said top surface.

13. The combination of claim 10, wherein said mounting box further comprises a rain drip flange, wherein said rain drip flange extends from side to side across said bottom surface of said box-shaped structure, and wherein said rain drip flange is continuous with said shoulders.

14. The combination of claim 10, wherein said mounting box further comprises i) a cover plate having an opening to engage said box-shaped structure; and ii) a lock to reversibly secure said cover plate to said box-shaped structure.

15. The combination of claim 14, wherein said mounting box further comprises i) a protuberance in said cover plate; and ii) an indent in said box-shaped structure, wherein said indent is engageable with said protuberance.

16. The combination of claim 14, wherein said cover plate comprises a cover plate flange around its periphery, and wherein and a distance separating said cover plate flange and said nailing flange can be changed by reversing the side of said cover plate flange that faces said nailing flange.

17. The combination of claim 10, wherein said bottom surface of said box-shaped structure has an opening that allows moisture inside said box-shaped structure to escape.

* * * * *